United States Patent [19]

Foster et al.

[11] Patent Number: 4,993,169
[45] Date of Patent: Feb. 19, 1991

[54] SEAT SLOT GAGE TOOL

[76] Inventors: James H. Foster, 5050 Ambassador Way, No. 301, Houston, Tex. 77056; H. George Butler, 714 Cherry Bark La., Houston, Tex. 77079

[21] Appl. No.: 537,021

[22] Filed: Jun. 12, 1990

[51] Int. Cl.⁵ .............................................. G01B 5/00
[52] U.S. Cl. ........................................ 33/783; 33/501
[58] Field of Search ................ 33/783, 827, 542, 501, 33/517, 501.45; 277/9 R, 11

[56] References Cited

U.S. PATENT DOCUMENTS 2,382,759  8/1945  Weiss et al. ..................... 33/827 X
2,602,234  7/1952  Croker .............................. 33/827

FOREIGN PATENT DOCUMENTS 167887  8/1921  United Kingdom ................. 33/827

Primary Examiner—Harry N. Haroian
Attorney, Agent, or Firm—James E. Bradley

[57] ABSTRACT

A gaging device will measure the widths between opposed seat faces in an orifice fitting. The orifice fitting has a body with flow passages for connecting into a pipeline. A seat slot locates in the flow passage. A carrier will move from an upper chamber in the body downward into the seat slot. When gaging, deformable plugs will be mounted to the carrier. The plugs have dimensions that are greater than the width of the slot. Each plug will deform as the carrier moves into the seat slot. When the carrier is removed from the seat slot, the plugs can be measured to determine the widths of the seat slot at various points.

9 Claims, 2 Drawing Sheets

SEAT SLOT GAGE TOOL

BACKGROUND OF THE INVENTION

1. Field of the Invention

This invention relates in general to orifice fitting equipment for connection into a pipeline for measuring gas flow by means of monitoring a pressure drop through an orifice plate, and in particular to a means for gaging the width of the seat slot that receives the orifice plate and plate carrier.

2. Description of the Prior Art

An orifice fitting is an assembly used to measure gas flow. The fitting includes a body which has a passage for connection into a gas pipeline. The passage has a seat slot which is perpendicular to the gas flow. The seat slot has opposed seat faces.

A plate carrier will move from an upper chamber down into the seat slot. The plate carrier has a circular opening contained in an orifice plate. The orifice plate has an opening through which the gas will flow. The pressure drop that flows through this opening will be monitored. Measurement equipment will be able to determine the gas flow rate based on the pressure drop.

It is important to have a good seal, particularly at the downstream seat face. If the plate carrier does not seal properly in the seat slot, leakage will occur past the plate. This leakage can provide erroneous readings. While the width of the seat slot will be manufactured to a specified tolerance, during pressure testing, portions of the slot width may exceed and remain permanently in excess of the tolerance. Currently, there is no method to determine the width of the seat slot while the orifice fitting is connected into the pipeline.

SUMMARY OF THE INVENTION

In this invention, at least one deformable member will be mounted to the carrier. This deformable member protrudes out from both sides of the carrier. The width of the deformable member from one side to the other will exceed the nominal width of the seat slot.

When desiring to gage the seat slot, the plate carrier will be removed and the orifice plate taken from the plate carrier. The deformable member will be mounted to the plate carrier. The plate carrier will be lowered into the seat slot. The outer ends of the deformable member will contact the seat slot and deform. The material of the deformable member is such that it will retain the deformation while the plate carrier is pulled to the surface. The operator will measure the deformable member to determine the width of the seat slot.

In the preferred embodiment, a plurality of deformable members are used. Each deformable member comprises a small cylindrical plug inserted within a hole in a disk. The disk locates within the central opening in the plate carrier.

DETAILED INVENTION OF THE DESCRIPTION

Figure 1:
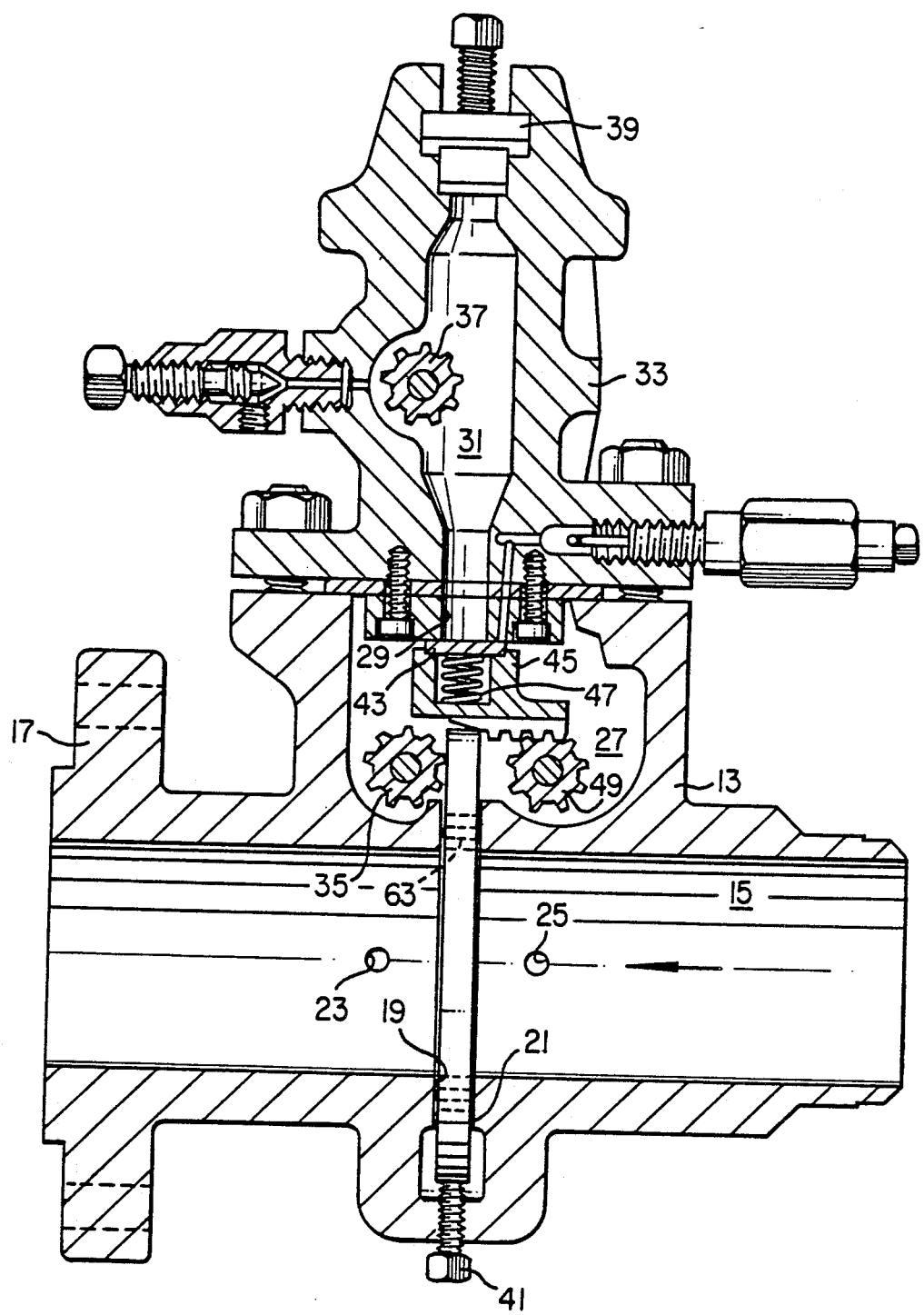
FIG. 1 is a vertical sectional view, partially schematic, of an orifice fitting constructed in accordance with this invention.

Referring to FIG. 1, orifice fitting 11 has a body 13. A flow passage 15 has a flange 17 for connection to a pipeline (not shown). The other end of the flow passage 15 will also connect to a pipeline. A seat slot 19 locates in the body 13 surrounding the flow passage 15 and perpendicular to the axis of the flow passage 15. A plate carrier 21 will move into the seat slot 19. Normally, the plate carrier 21 will carry an orifice plate (not shown) which has a central orifice through which gas in the flow passage 15 flows. Ports 23, 25 monitor the pressure on each side of the plate carrier 21 to determine the gas flow rate.

The body 13 has a lower chamber 27 located above the flow passage 15. A slot 29 in the upper end of the lower chamber 27 connects the lower chamber 27 to an upper chamber 31. Upper chamber 31 is in an upper body section 33, which is considered part of the body 13.

Figures 2, 3:
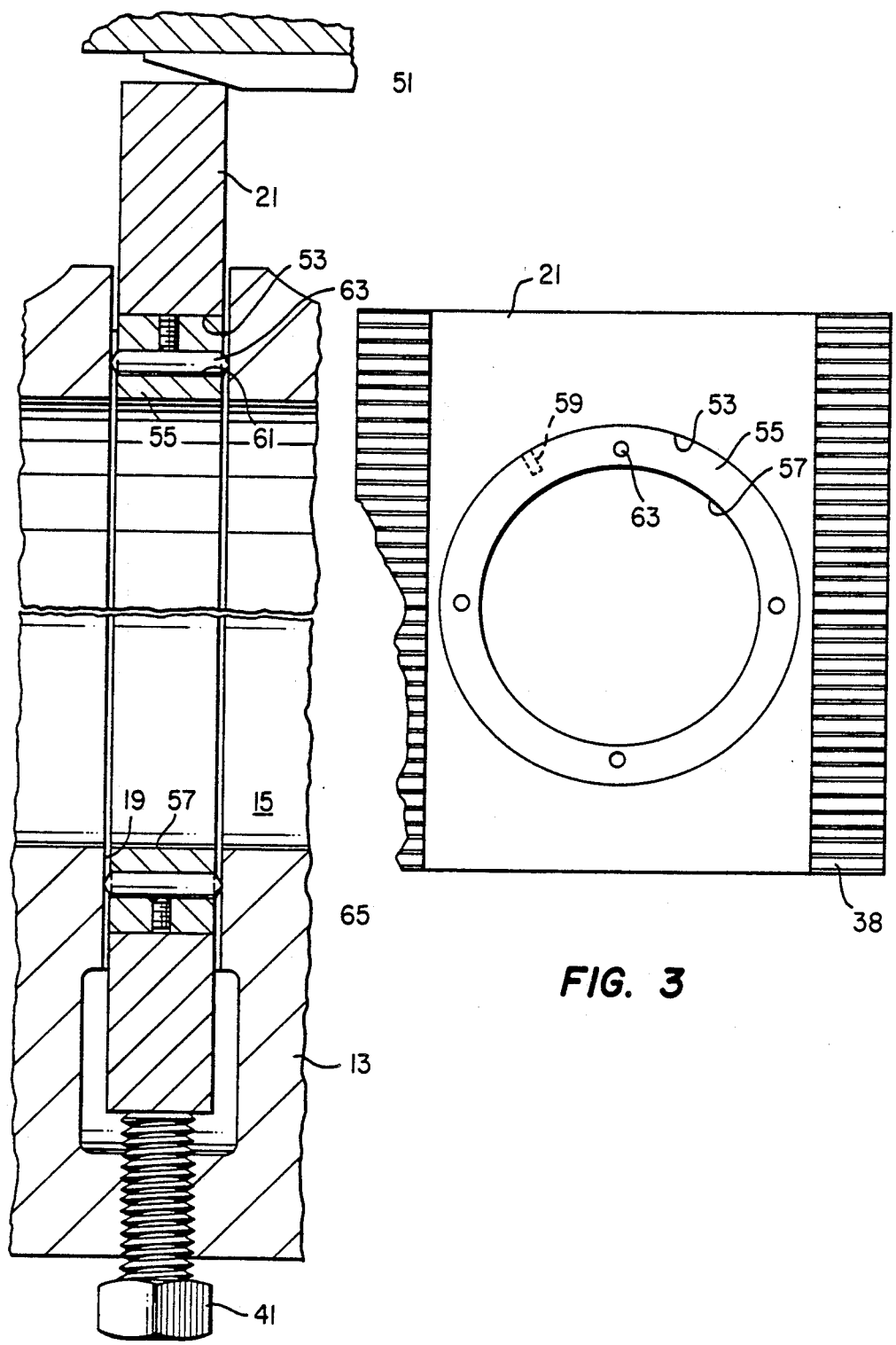
FIG. 2 is a partial, enlarged sectional view of a portion of the orifice fitting of FIG. 1, and showing the gage tool.
FIG. 3 is a partial front view of the gage tool shown in FIG. 2.

Gears 35 and 37 will engage teeth 38 formed on the side edges of the plate carrier 21, as shown in FIG. 3. The gears 35, 37 are on shafts which can be connected to handles on the exterior for moving the plate carrier 21 up through the lower chamber 27 and into the upper chamber 31. A stop 41 on the lower end of the seat slot 19 determines the lower extent of travel of the plate carrier 21.

A slide valve 43 will close the lower chamber 27 from the upper chamber 31 by closing the slot 29. A slide valve carrier 45 moves the slide valve 43 between an open position and a closed position shown in FIG. 1. Springs 47 urge the slide valve 43 upward from the slide valve carrier 45. A gear 49 engages teeth on the slide valve carrier 45 to move the slide valve carrier between the open and closed positions. A cam plate 51, shown in FIG. 2, will engage the upper edge of the plate carrier 21 to hold it in the lower position.

Referring still to FIG. 2, plate carrier 21 has a large central opening 53. Normally, an orifice plate (not shown) will fit within the opening 53. When it is desired to measure the seat slot 19, the orifice plate will be removed and a gaging disk 55 will be mounted to the plate carrier 21 in the opening 53. Disk 55 is a circular ring, having a central opening 57. One or more set screws 59 (FIG. 3) frictionally retain the disk 55 within the opening 53. Each set screw 59 will extend from the inner diameter of disk 55 to the outer diameter, which is flush with the opening 53.

A plurality of holes 61, preferably four, extend completely through the disk 55. The holes 61 are spaced evenly around the disk 55. A deformable member or plug 63 will insert within each hole 61. Each plug 63 is of a material which easily deforms and which retains the deformation. This material is preferably lead. Each plug 63 is a small cylindrical member. The outer ends or tips of the plugs 63 protrude slightly past each face of the disk 55.

In the preferred embodiment, the nominal or designed width of the seat slot 19 is 0.688 inch with a tolerance of plus 0.003 minus 0.00 inch. The plugs 63 preferably have a dimension from one end to the other of 0.750 inch, slightly greater than the nominal width of the seat slot 19. Each plug 63 is retained by a set screw 65. Set screw 65 extends from the outer diameter of disk 55 into engagement with the sidewall of each plug 63.

In operation, to gage the width of the seat slot 19, the user will first rotate gear 49 to retract the slide valve carrier 45. He then rotates gears 35, 37 to move the plate carrier 21 to the upper chamber 31. The user will close the slide valve 43 by moving the slide valve carrier 45 back in the opposite direction with gear 49. The user will bleed off the pressure in the upper chamber 31 to atmospheric, using conventional bleed off equipment on the orifice fitting 11. The user will open the slide plate 39. He will then rotate the gear 37 to eject the plate carrier 21 from the orifice fitting 11.

The user then removes the existing orifice plate (not shown) and places the disk 55 in place. The disk 55 will have the plugs 63 installed. The user then lowers the plate carrier 21 back into the upper chamber 31 and closes the slide plate 39. The user opens the slide valve 43 and lowers the plate carrier 21 into the seat slot 19.

As the plate carrier 21 enters the seat slot 19, the tips of the plugs 63 will contact each face of the seat slot 19. The contact will cause the plugs 63 to deform. The user will then reverse the process and pull the plate carrier 21 again from the orifice fitting 11. The user will remove the disk 55 and measure the dimension of each plug 63 from one tip to the other. This will provide the user with the width of the seat slot 19 at four different points. The disk 55 can later be reused by removing the plugs 63 from the holes 61 and inserting new plugs 63.

The invention has significant advantages. The gaging device allows the seat slot to be gaged for width while the fitting is still connected into the pipeline. The gaging device provides an accurate width of the seat slot at various points around the circumference of the seat slot.

While the invention has been shown in only one of its forms, it should be apparent to those skilled in the art that it is not so limited, but is susceptible to various changes without departing from the scope of the invention.

We claim:

1. Gaging means for measuring between opposed seat faces in an orifice fitting of the type having a body with a flow passage for connecting into a pipeline, and a seat slot located in the flow passage, defining the opposed seat faces, the gaging means comprising in combination:
   a carrier;
   means in the body for moving the carrier from an inactive position out of the flow passage to an active position in the seat slot;
   at least one deformable member;
   mounting means for mounting the deformable member to the carrier for protruding from the carrier in opposite directions from the carrier;
   the deformable member having dimensions selected so that the distance from the outer extent of the deformable member on one side of the carrier to the outer extent of the deformable member on the other side of the carrier being greater than the nominal width of the seat slot, so that the deformable member will contact the opposed seat faces when the carrier is moved into the seat slot; and
   the deformable member being of a material which deforms when contacted by the seat faces and which retains the deformation when the carrier is removed from the seat slot, enabling one to measure the deformable member to determine the actual width of the seat slot.

2. The gaging means according to claim 1 wherein the carrier has a circular opening, and wherein the mounting means comprises:
   a circular disk adapted to fit within the circular opening, the deformable member being secured to the disk.

3. The gaging means according to claim 1 wherein the carrier has a circular opening, and wherein the mounting means comprises:
   a circular disk adapted to fit within the circular opening;
   a plurality of holes extending through the disk perpendicular to the disk; and
   wherein there are a plurality of the deformable members, each located in one of the holes, with one end of each deformable member protruding from one side of the disk and another end of each deformable member protruding from the other side of the disk.

4. Gaging means for measuring between opposed seat faces in an orifice fitting of the type having a body with a flow passage for connecting into a pipeline, and a seat slot located in the flow passage, defining the opposed seat faces, the gaging means comprising in combination:
   a carrier;
   means in the body for moving the carrier from an inactive position out of the flow passage to an active position in the seat slot;
   a plurality of deformable plugs;
   mounting means for mounting each of the plugs to the carrier for protruding from the carrier perpendicular to and in opposite directions from the carrier;
   each of the plug having dimensions selected so that the distance from the outer extent of the plugs on one side to the outer extent of the plugs on the other side of the carrier being greater than the nominal width of the seat slot, so that the plugs will contact the opposed seat faces when the carrier is moved into the seat slot; and
   the plugs being of a material which deforms when contacted by the seat faces and which retains the deformation when the carrier is removed from the seat slot, enabling one to measure the plugs to determine the actual width of the seat slot.

5. The gaging means according to claim 4 wherein the carrier has a circular opening, and wherein the mounting means comprises:
   a circular disk adapted to fit within the circular opening, the plugs being secured to the disk.

6. The orifice fitting according to claim 4 wherein the carrier has a circular opening, and wherein the mounting means comprises:
   a circular disk adapted to fit within the circular opening;
   a plurality of holes extending through the disk perpendicular to the disk; and
   each of the plugs located in one of the holes, with one end of each plug protruding from one side of the disk and another end of each plug protruding from the other side of the disk.

7. Gaging means for measuring between opposed seat faces in an orifice fitting of the type having a body with a flow passage for connecting into a pipeline, a seat slot located in the flow passage, defining the opposed seat faces, a plate carrier having a circular opening for carrying an orifice plate, means in the body for moving the plate carrier from an inactive position out of the flow passage to an active position in the seat slot, the gaging means comprising in combination:

a circular disk adapted to fit within the circular opening of the plate carrier when the orifice plate is removed;

a plurality of holes extending through the disk perpendicular to the disk; and a plurality of deformable plugs, each of the plugs located in one of the holes, with one end of each plug protruding from one side of the disk and another end of each plug protruding from the other side of the disk;

each of the plug having dimensions selected so that the distance from one end to the other end of the plugs being greater than the nominal width of the seat slot, so that the plugs will contact the opposed seat faces when the plate carrier is moved into the seat slot; and the plugs being of a material which deforms when contacted by the seat faces and which retains the deformation when the plate carrier is removed from the seat slot, enabling one to measure the plugs to determine the actual width of the seat slot.

8. A method for measuring between opposed seat faces in an orifice fitting of the type having a body with a flow passage for connecting into a pipeline, and a seat slot located in the flow passage, defining the opposed seat faces, the gaging means comprising in combination:

providing a carrier;

mounting at least one deformable member to the body so that it protrudes from the carrier in opposite directions from the carrier with a greater overall width than the nominal width of the seat slot;

moving the carrier into the seat slot, contacting the opposed faces with the deformable member, and deforming the deformable member to the width of the seat slot; then removing the carrier from the seat slot; then measuring the deformable member to determine the actual width of the seat slot.

9. The method according to claim 8 wherein a plurality of the deformable members are mounted to the carrier.

* * * * *